W. BARTHOLOMEW.
BALL BEARING FOR WASHING MACHINES.
APPLICATION FILED FEB. 25, 1911.
1,171,303.
Patented Feb. 8, 1916.
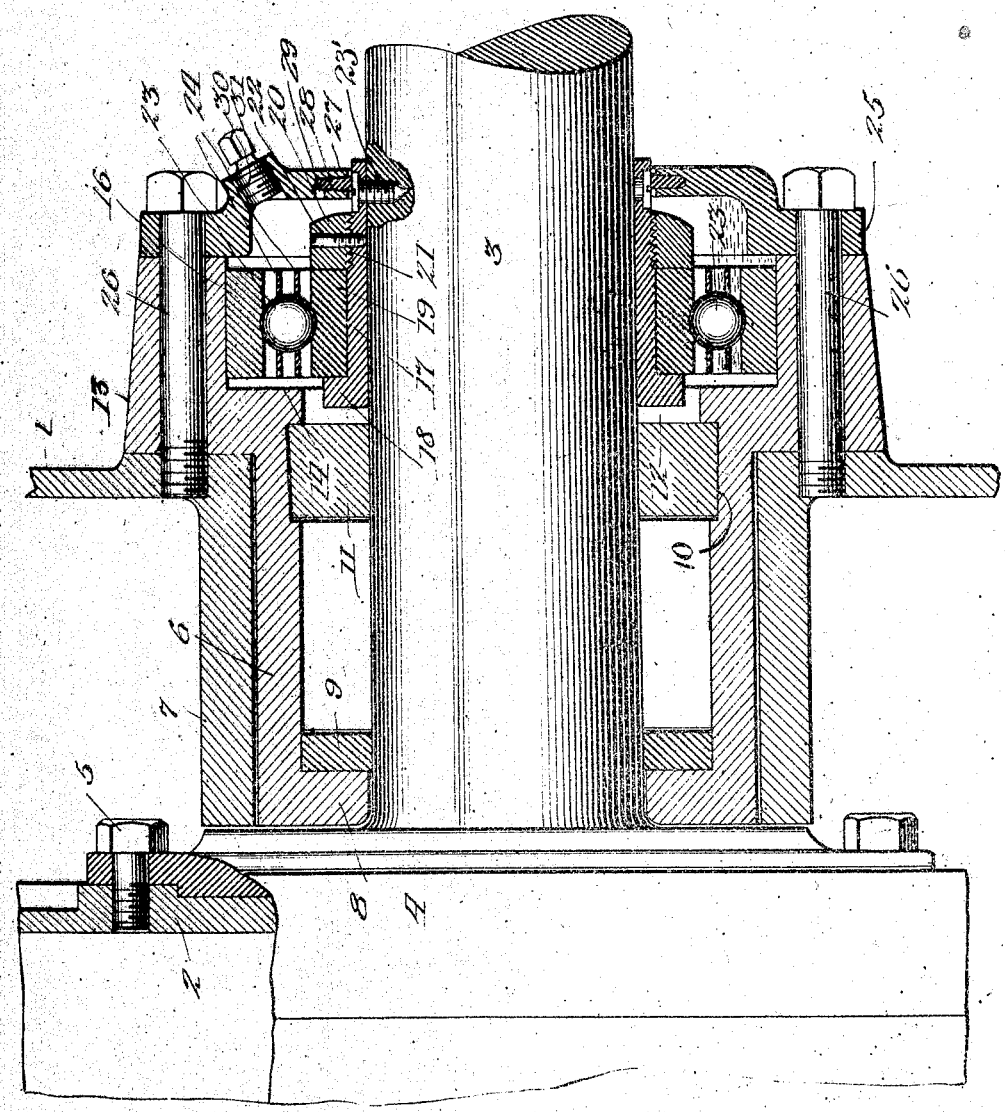
WITNESSES
Philip E. Barnes
INVENTOR
William Bartholomew
E. B. Stocking, Attorney

UNITED STATES PATENT OFFICE.

WILLIAM BARTHOLOMEW, OF CHICAGO, ILLINOIS, ASSIGNOR TO TROY LAUNDRY MACHINERY COMPANY, LIMITED, OF CHICAGO, ILLINOIS, A CORPORATION OF NEW YORK.

BALL-BEARING FOR WASHING-MACHINES.

1,171,303.   Specification of Letters Patent.   Patented Feb. 8, 1916.

Application filed February 25, 1911. Serial No. 610,761.

*To all whom it may concern:*

Be it known that I, WILLIAM BARTHOLOMEW, a citizen of the United States, residing at Chicago, county of Cook, State of Illinois, have invented certain new and useful Improvements in Ball-Bearings for Washing-Machines, of which the following is a specification, reference being had therein to the accompanying drawing.

This invention relates to ball bearings for washing machines and more particularly to trunnion bearings for the inner cylinder, the object being to provide a ball bearing which is so constructed that a steam-tight joint is formed in order to prevent the escape of steam from the casing.

Another object of the invention is to provide a bearing with novel means for lubricating the same, the balls being carried by a boxing adapted to contain lubricating oil whereby the balls will travel in oil when the trunnion is rotated.

A further object of the invention is to provide a bearing which is so constructed that all danger of any oil entering the casing from the bearing is prevented.

Other and further objects and advantages of the invention will be hereinafter set forth and the novel features thereof defined by the appended claims.

Like numerals of reference refer to like parts in the accompanying drawing.

In the drawing, I have shown a longitudinal vertical section through my improved bearing in which 1 indicates the outer casing of a washing machine, 2 the cylinder arranged therein and 3 a trunnion for supporting said cylinder. In the drawing, I have shown the trunnion for carrying the master drive gear but it is, of course, understood that by slightly changing the construction of the cap of the bearing, the bearing can be used for supporting the trunnion at the opposite end of the cylinder. The trunnion 3 is provided with a head plate 4 secured to the end of the cylinder 2 by bolts 5 as clearly shown, and said trunnion extends through a boxing 6 arranged in an inwardly extending housing 7 formed on the head of the casing 1.

The boxing 6 is provided with an annular flange 8 at its inner end against which is arranged a packing ring 9 so as to completely close the space between the flange and trunnion whereby an exceedingly tight joint is formed in order to prevent the escape of any steam from the casing or the passage of any oil from the boxing to the casing. The boxing is also formed with an annular groove 10 in which is arranged a ring 11 forming the inner wall of an oil chamber 12 as will be later described. The outer portion of the boxing is enlarged as shown at 13 forming an annular shoulder which is adapted to engage the head of the casing 1 and said enlargement is rabbeted annularly as shown at 14 in which is arranged a ring having a ball race 16. Arranged on the trunnion 3 within the boxing 6 is a collar 17 having an annular flange 18 against which is held a co-acting ring having a ball race 19, said ring being held firmly in position on the collar by a fastening ring 20, said fastening ring being internally threaded and working upon the threaded portion 21 of the collar 17 whereby the ring having a ball race 19 can be quickly removed when desired. In order to prevent the fastening ring 20 from working loose, I provide the same with set-screws 22 which extend into threaded bores formed in the collar 17. The outer end of the collar 17 is annularly reduced and is provided with openings through which machine screws 23' pass into threaded bores formed in the trunnion for locking said collar thereon. Arranged between the ball races 16 and 19 are balls 23 carried by spacing rings 24, said balls traveling in annular grooves formed in the races.

The outer end of the boxing 6 is inclosed by a cap ring 25 secured in position by bolts 26 which extend through the enlargement 13 of the boxing 6 into threaded bores formed in the head of the casing 1, said bolts serving the purpose for fastening the cap ring and the boxing to the head of the casing. The inner edge of the ring 25, which surrounds the reduced portion of the collar, is annularly grooved as shown at 27 and adapted to receive a packing ring 28 in order to form a tight joint between the collar and cap ring, said groove having vents 29 for the purpose of allowing the escape of air from the grooves when the rings are being forced into position and for allowing oil to be absorbed by said packing rings. The cap ring is provided with a filling opening 30 closed by a screw plug 31 for filling the chamber 12 formed by the boxing, bearing ring and cap ring, and the oil is adapted to be maintained at a level within the chamber, as clearly shown, in order to thoroughly lubricate the bearing.

From the foregoing description, it will be seen that I have provided a ball bearing especially adapted to be used in connection with rotary washing machines, whereby the washing cylinder carrying the trunnions will be mounted in such a manner that all danger of the escape of steam or any oil passing from the bearing into the casing is prevented by the bearing ring and packing ring and at the same time an exceedingly simple and cheap bearing is formed.

Having described my invention and set forth its merits, what I claim and desire to secure by Letters Patent is—

1. In a bearing of the kind described, the combination with a tubular housing, an annular grooved boxing arranged within said housing having an enlarged outer end engaging the end of the housing and secured thereto, said enlarged portion forming an oil chamber, said boxing having an annular flange at its inner end, a packing arranged against said flange, a ring arranged within said groove, a trunnion extending through said boxing, a collar carried by said trunnion having a reduced end, rings having ball races carried respectively by the boxing and collar within said oil chamber, balls disposed within said rings, a cap for closing said boxing having an annular groove provided with vents, and a packing ring arranged in said groove bearing against said collar.

2. The combination with a pair of concentrically arranged cylinders, one of said cylinders having a trunnion and the other a housing to receive said trunnion, a boxing arranged in the housing of the outer cylinder, said trunnion extending into said boxing, said boxing having an annular flange at its inner end and provided with an oil chamber at its outer end, a packing ring surrounding said trunnion against said flange, said boxing having an annular groove, a ring arranged within said groove, a collar fixed on said trunnion having a reduced end, rings having ball races carried respectively by the boxing and collar within said oil chamber, balls disposed between said rings in said ball races, an adjustable ring for securing one of said rings upon said collar, and means for locking said adjustable ring in adjusted position.

In testimony whereof I affix my signature in presence of two witnesses.

WILLIAM BARTHOLOMEW.

Witnesses:
C. I. BELKNAP,
WM. KROGMAN.